United States Patent
Mori

[19]

[11] Patent Number: 5,998,994
[45] Date of Patent: Dec. 7, 1999

[54] MR HEAD OFFSET CORRECTION METHOD AND MAGNETIC DISK CERTIFIER

[75] Inventor: Kyoichi Mori, Kanagawa-ken, Japan

[73] Assignee: Hitachi Electronics Engineering Co., Ltd., Tokyo, Japan

[21] Appl. No.: 09/015,249

[22] Filed: Jan. 29, 1998

[30] Foreign Application Priority Data

Jan. 31, 1997 [JP] Japan ................................. 9-033386

[51] Int. Cl.$^6$ ........................... G11B 27/36; G11B 5/596
[52] U.S. Cl. ..................... 324/212; 360/75; 360/77.02; 360/77.06; 369/55; 369/56
[58] Field of Search .............................. 324/212, 207.12, 324/225, 226, 262; 360/31, 75, 77.02, 77.06; 369/43, 55, 56

[56] References Cited

U.S. PATENT DOCUMENTS

5,032,932   7/1991   Kogure et al. ..................... 360/77.06

Primary Examiner—Walter E. Snow
Attorney, Agent, or Firm—Beall Law Offices

[57] ABSTRACT

A test data is written in an arbitrary point p on a non-linear characteristics portion of a hysteresis characteristics of a piezo actuator by a write head and the written test data is read out by an MR head using the point p as a reference to detect a maximum read-out voltage to thereby obtain a drive voltage of the piezo actuator corresponding thereto. From the drive voltage of the piezo actuator thus obtained, a position of the MR head whose offset is to be corrected is detected. In a magnetic disk certifier, the position of the MR head is corrected by applying the drive voltage corresponding to the maximum read-out voltage to the piezo actuator and the written test data is read out thereby. Thus, the position of the MR head on the piezo actuator becomes that of the write head when the offset correction value is detected and it becomes possible to correct the offset of the MR head with respect to the write head.

13 Claims, 7 Drawing Sheets

MR HEAD OFFSET CORRECTION METHOD AND MAGNETIC DISK CERTIFIER

2. DESCRIPTION

2-1. Technical Field

The present invention relates to an offset correction method of a MR (magneto-resistance) head and, particularly, to an offset correction method of a MR head which certifies a magnetic disk for facilitating a correction of an offset of a write inductive head and a read MR head and a magnetic disk certifier using a MR head.

2-2. Background Art

A hard magnetic disk to be incorporated in a disk drive is manufactured as a unit and then is classified in quality into a plurality of ranks by certifying on electric performance thereof as a magnetic medium by a certifier, so that the magnetic disk is guaranteed in quality as in a rank to which it is classified.

Figure 7:
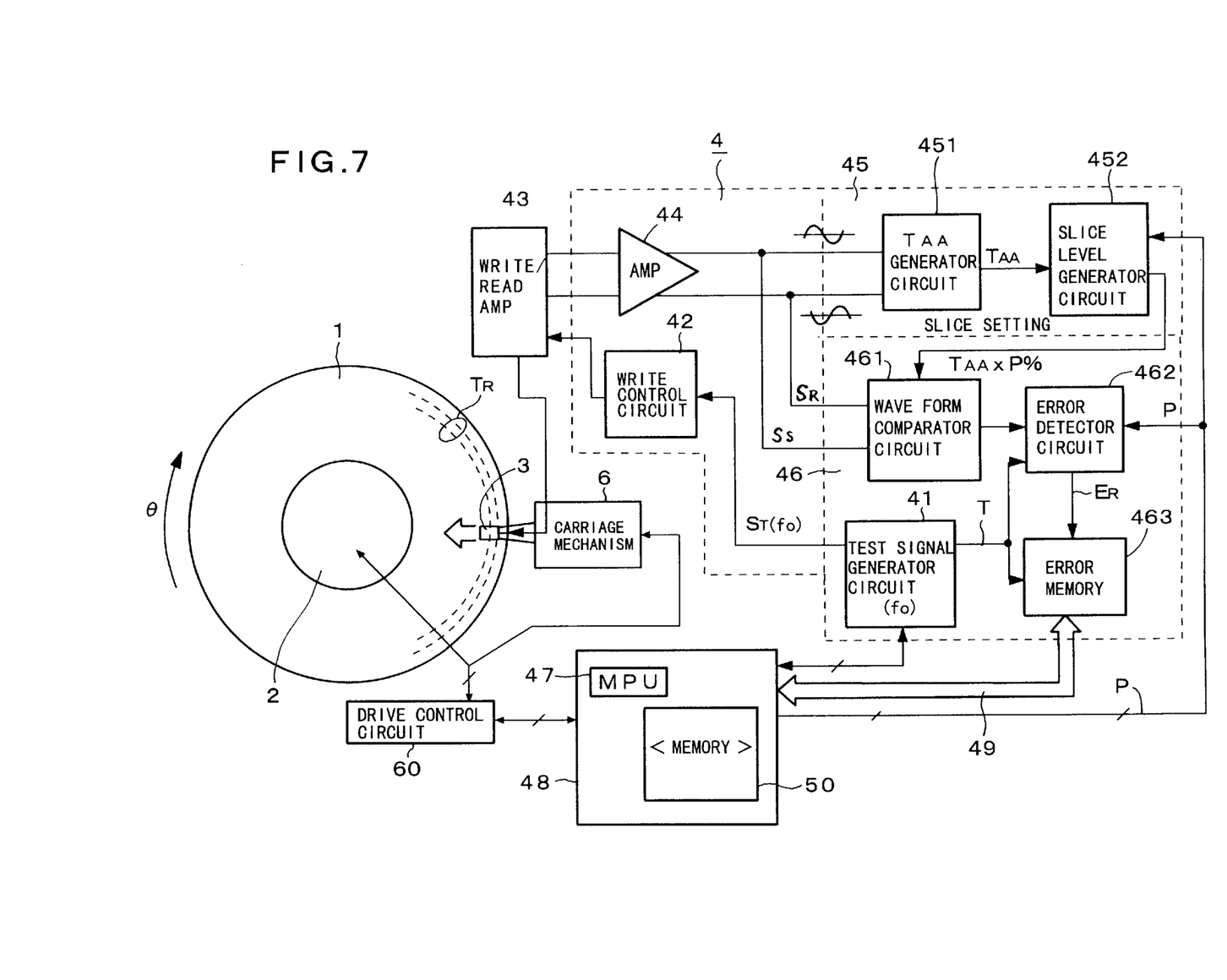
FIG. 7 is a block diagram of a conventional certifier.
Figure 8:
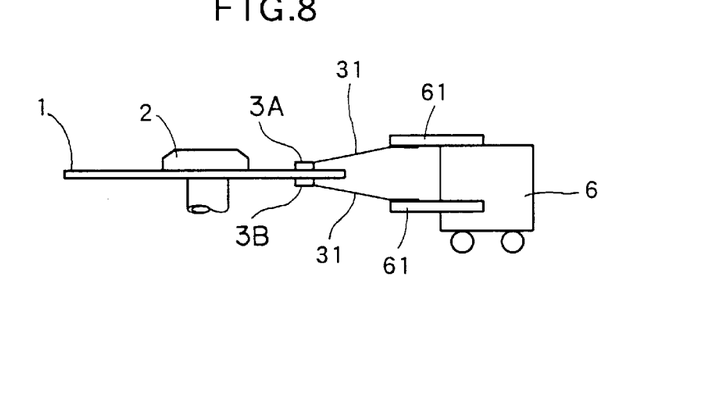
FIG. 8 schematically shows a carriage of the conventional certifier shown in FIG. 7.

FIG. 7 shows a construction of a conventional certifier schematically and FIG. 8 shows a relation of a carriage and heads.

A hard magnetic disk (referred to as merely "disk", hereinafter) 1 is mounted on a spindle 2 and rotated thereby. Magnetic heads 3A and 3B (FIG. 8) arranged on opposite surfaces of the disk 1 are supported by support arms 61 through suspension springs 31, respectively. The support arms 61 are mounted on a carriage mechanism 6. Each of the magnetic heads 3A and 3B includes a data write inductive head and a data read MR head. The respective magnetic heads are sequentially positioned at a plurality of tracks TR on the opposite surfaces of the disk 1 while being moved radially of the disk 1 by the carriage mechanism 6 and the electric performance thereof is certified at respective positions.

The carriage mechanism 6 and the spindle 2 are driven under control of a drive control circuit through a data processor. The drive control circuit and the data processor will be described later.

Since the magnetic heads 3A and 3B are identical in construction and operation except that they are arranged on the opposite surfaces of the disk 1, they will be described as a single magnetic head 3. Further, the magnetic head 3 may be mounted on an extension of the moving direction of the support arm 61 or may be mounted in a direction perpendicular to the moving direction of the support arm 61. In this description, however, the magnetic head 3 is assumed to be arranged on the extension of the moving direction of the support arm 6.

FIG. 7 is a block circuit diagram of a conventional magnetic disk certifier 4. In FIG. 7, a test signal $S_T$ having a frequency $f_0$ generated by a test signal generator circuit 41 of the magnetic disk certifier 4 is supplied to a write control circuit 42. A test data is generated correspondingly to the test signal $S_T$ in the write control circuit 42 and is supplied to a write/read amplifier 43 in which the test data is converted into a write current having a predetermined level and sequentially written in the respective tracks $T_R$ of the magnetic disk 1 through the magnetic disk 3.

After the test data is written in all of the tracks $T_R$ on the magnetic disk 1, the written test data are sequentially read out by the magnetic head 3 as a positive and negative phase signals through the write/read amplifier 43 and sent to a level regulating amplifier (AMP) 44. A positive and negative phase signals $S_S$ and $S_R$ which correspond to the test signal $S_T$ having frequency $f_0$ and are output from the level regulating amplifier 44 are supplied to a slice level setting circuit 45 and a defect detector circuit 46 as read-out signals.

The slice level setting circuit 45 includes a track average amplitude generator circuit (referred to as "$T_{AA}$ generator circuit", hereinafter) 451 for generating an average voltage value for one track and a slice level generator circuit 452. The $T_{AA}$ generator circuit 451 generates a track average amplitude, that is, a peak to peak average voltage value for one track of the read-out signal 1. There may be a case where the $T_{AA}$ voltage value is calculated on the positive side of the read-out signal and on the negative side, independently.

The $T_{AA}$ generator circuit 451 includes, for example, an envelope detector circuit, an integrator circuit for integrating voltage for one complete track and a peak detector circuit, etc., all of which are not shown. The $T_{AA}$ voltage value output from the $T_{AA}$ generator circuit 451 is supplied to the slice level generator circuit 452. The slice level generator circuit 452 generates a voltage value which is a predetermined fraction or percentage (%) of the output voltage level of the $T_{AA}$ generator circuit 451 as a threshold value, that is, a slice level. The predetermined fraction or percentage is set by a signal P supplied from a CPU 47 of a control unit 48. The slice level signal generated by the slice level generator circuit 452 is sent to the defect detector circuit 46.

The defect detector circuit 46 includes, in addition to the test signal generator circuit 41, a waveform comparator circuit 461, an error detector circuit 462 and an error memory 463. The error detector circuit 462 is constructed with a gate circuit. In a case of the missing test, for example, the error detector circuit 462 counts period T/4 pulses generated by a period T of a timing pulse signal T, which respectively correspond to bits of the test data supplied from the test signal generator circuit 41, for a period of the detection signal obtained from the waveform comparator circuit 461 as a window pulse having a predetermined set period, for example, $1.5t \pm \alpha$ (where t is a bit period of the test data and $\alpha$ is a tolerance in which the peak is allowed to-shift) and output a bit error signal $E_R$ in synchronism with the timing signal T when there is no output of the waveform comparator circuit 461.

The bit error signal $E_R$ output from the error detector circuit 462 indicates an absence of error when it is "0" and a presence of error when it is "1" and is sent to the error memory 463. The bit error signal indicative of presence of error will be referred to as "error detection bit". The error memory 463 responds to the timing signal T from the test signal generator circuit 41 to sequentially update addresses thereof and sequentially stores the bit signals "1" and "0" output from the error detector circuit 462 in the updated addresses as defect data.

The CPU 47 reads the content of the error memory 463 in the memory 50 through a bus 49 at a time when the test of the whole tracks of the magnetic disk 1 completes and evaluates the quality of the magnetic disk 1 according to the content of the error memory 463.

Figure 9:
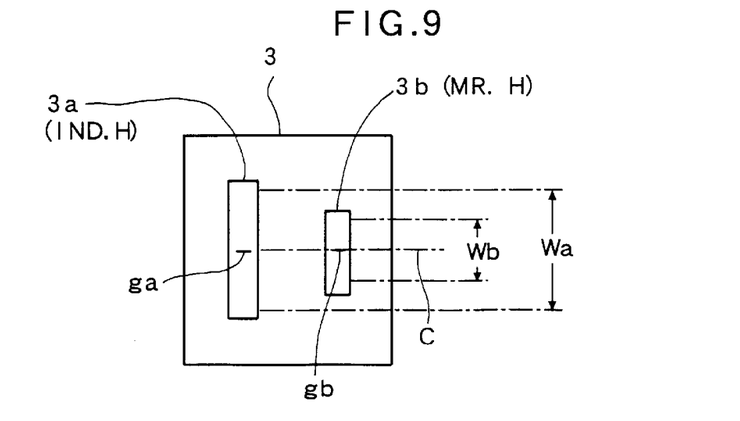
FIG. 9 shows a construction of the MR head of a magnetic head of the certifier.

FIG. 9 is a front view of the magnetic head 3. The magnetic head 3 includes a write inductive head (IND.H) $3a$ and a read MR head (MR.H) $3b$. The respective heads $3a$ and $3b$ have gaps ga and gb in intermediate portions thereof whose centers C are ideally coincident with each other. The inductive head $3a$ writes data in a region having a width (sensitive width) Wa for the track TR correspondingly to the width of the gap ga and the MR head $3b$ reads data from a width (sensitive width) Wb corresponding to the width of the gap gb.

In FIG. 9, the centers of the gaps ga and gb are on an identical line C and there is no positional deviation between the both gaps, that is, the so-called offset, in the heads 3a and 3b. However, there may be some offset in the both heads practically. This offset is the problem in the certifier. The offset will be described with reference to FIGS. 10 to 12.

Figure 10:
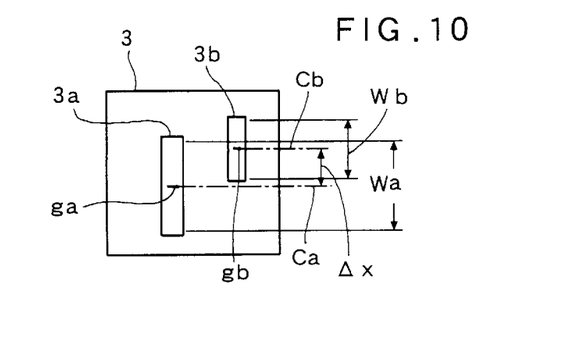
FIG. 10 is a diagram of the magnetic head for explaining the offset of the MR head with respect to an induction head of the magnetic head.
Figure 11:
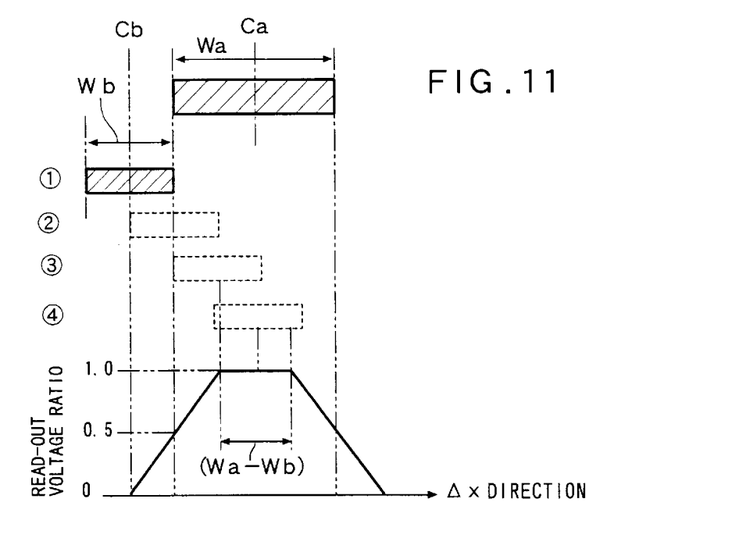
FIG. 11 is a graph showing a variation of a read-out voltage (ratio) of the MR head with respect to the offset and the characteristics thereof.

In FIG. 10, Ca depicts a center line of the gap ga of the inductive head 3a and Cb depicts a center line of the gap gb of the MR head 3b. The offset is a distance Δx between the center lines Ca and Cb. FIG. 11 shows a variation of a read voltage of the MR head 3b with respect to the offset Δx. The inductive head 3a writes test data uniformly along the track TR in a range having a width Wa (sensitive width), although the test data is not written uniformly in the range practically and the data write in both side portion of the sensitive width is lighter than that in the center portion thereof. The MR head 3b reads the written data at the gap gb thereof. In this case, a width of a range from which the MR head 3b can read the data is a sensitive width Wb.

It is assumed here that the magnetic head 3 moves from left to right and, therefore, the MR head 3b moves from left to right. At a position ① in FIG. 11, the right side end of the sensitive width Wb of the MR head 3b corresponds to the left side end of the width Wa of the written test data. From this position, the gap gb of the MR head 3b becomes possible to read the test data written by the inductive head 3a from the left side end thereof. However, a read voltage at this position is still zero.

For simplicity of description, a read-out voltage of the MR head 3b will be shown by a positive fraction with 1 being the maximum read-out voltage, that is, by a ratio to the maximum read-out voltage which is an absolute number of 1. It should be noted that the sensitive widths Wa and Wb of the heads are determined by the gap widths ga and gb thereof, respectively. The sensitive width wb of the MR head 3b is about several microns.

At a position ②, the sensitive width Wb of the MR head 3b enters into the write width Wa by Wb/2. The read-out voltage is 0.5 if the test data is uniformly written. At the position ③, the width Wb of the MR head 3b overlaps with the width Wa of the inductive head 3a with the left side ends thereof being coincident. The read-out voltage in this state is maximum, that is, 1.0. When Wa>Wb, the read-out voltage is maintained at 1.0 within a width range (Wa−Wb). Therefore, as a result, a read-out voltage characteristics shown by a solid line is obtained.

Figure 12:
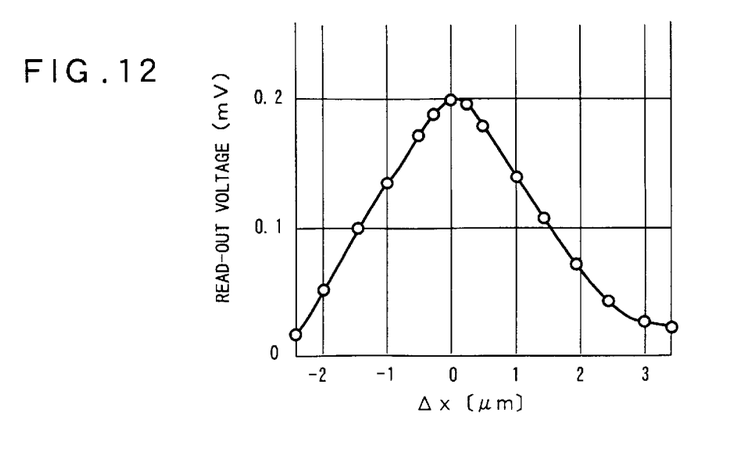
FIG. 12 is a graph showing a characteristics curve of an example of the measured data of the read-out voltage.

FIG. 12 shows a plot of actually measured read-out voltage of the MR head 3b with respect to the amount of offset Δx ($\mu$m). The read-out voltage at the offset Δx=±0.5 $\mu$m is 0.18 mV which is about 90% of the maximum voltage of 0.2 mV. With such decrease of the read-out voltage, the reliability of the magnetic disk certifier may be lowered.

In a magnetic disk drive in which the hard disk is actually incorporated, the MR head 3b is positioned in a suitable position according to a servo information and reads data written therein. On the other hand, the inductive head 3a is also positioned at a suitable position by the servo information and write data therein. Therefore, there is no positional problem of these heads even if there is an offset therebetween since these heads are suitably positioned respectively. Actually, it becomes equivalent to the state of heads shown in FIG. 9. However, in the certifying stage for testing the magnetic disk, there is no servo information written in the magnetic disk. Therefore, the offset between the MR head 3b and the inductive head 3a influences a result of test directly. This results in a lowered yield of disk. Therefore, the offset should be corrected to as close to zero as possible.

In view of this, a method of eliminating the offset in a read state by moving the MR head 3b has been considered. As one of mechanisms for performing this method, it has been proposed to finely move the MR head by a distance corresponding to the offset by means of a piezo actuator. In such case, however, the offset amount Δx of the MR head must be measured. Further, the piezo actuator has a hysteresis characteristics for a drive voltage thereof, that is, a voltage applied thereto. A relation between a moving distance and the voltage of the hysteresis characteristics of the piezo actuator is non-linear and not uniform. Therefore, this correction method is difficult to perform practically so far.

3. SUMMARY OF THE INVENTION

An object of the present invention is to provide an offset correction method of an MR head, which is capable of making the offset to substantially zero easily.

Another object of the present invention is to provide a magnetic disk certifier capable of certifying a magnetic disk with high precision by correcting an offset of an MR head to substantially zero.

In order to achieve the above objects, the magnetic disk certifier which includes a write head and a read MR head, according to the present invention, comprises a magnetic head moving mechanism for moving a magnetic head to a predetermined track position set on the magnetic disk and a piezo actuator having a maximum drive voltage for finely moving the magnetic head orthogonally of the track by extending or shrinking according to a drive voltage applied thereto, wherein the write head of the magnetic disk certifier writes test data on the track at an arbitrary point p on a specific hysteresis of the piezo actuator and the MR head of the magnetic disk certifier is moved from the point p to a point by a fine distance by the piezo actuator to read the written test data at the point to which the MR head is moved from the point p to thereby obtain the drive voltage corresponding to a maximum read-out voltage of the test data, and wherein the position of the MR head is corrected by writing the test data or a certain test data on a track of a certain magnetic disk to be tested by the write head set in the point p and, in reading the written test data by the MR head, applying the drive voltage corresponding to the maximum read-out voltage to the actuator.

In the present invention, the test data is written by the write head at the arbitrary point p on a non-linear characteristics portion of the hysteresis characteristics of the piezo actuator, the maximum read-out voltage is detected by reading the written test data by the MR head while moving the MR head finely from the point p to obtain the drive voltage of the piezo actuator corresponding to the maximum read-out voltage. In this manner, the position of the MR head at which the offset correction is to be made is detected. In the magnetic disk certifier, the magnetic head for data write is set in the point p and writes the test data and the written test data is read out by the MR head by correcting the position of the MR head by applying the drive voltage corresponding to the maximum read-out voltage to the piezo actuator. Thus, the position of the MR head on the piezo actuator when the MR head detects the offset correction value becomes in the same relation to the write head, so that it is possible to correct the offset of the MR head to the write head to substantially "zero".

The usual piezo actuator extends correspondingly to an applied voltage and shrinks when the applied voltage is lowered. However, an amount of extension (a forward path of the hysteresis characteristics curve) and an amount of shrinkage (a reverse or backward path of the hysteresis characteristics curve) of the piezo actuator are different with respect to a same drive voltage. Therefore, in selecting the arbitrary point p, the drive voltage V is increased from an original point (usually at 0 V) of the hysteresis curve to a predetermined drive voltage Vp and the write head, for example, an induction head, is set in a point p on the forward path of the major loop of the hysteresis curve, or the drive voltage is reduced to a value Vp' (Vp' may be equal to Vp) after increased to the maximum value Vm and the write head is set on a point p' on the backward path of the major loop of the hysteresis curve. With these procedures, the position of the magnetic head on the hysteresis curve is determined with respect to the magnetic disk and the magnetic head is positioned on a predetermined track of the magnetic disk.

In this state, the magnetic disk certifier writes the test data on this track. Then, the magnetic disk certifier detects a drive voltage with which the read voltage of the test data becomes maximum by reading the test data stored therein with using the MR head thereof while finely moving the MR head. There is no substantial offset of the MR head in relation to the point p in the position at which the read voltage becomes maximum.

Thus, the magnetic disk certifier can obtain the amount of offset correction of the MR head through the test data written in the selected arbitrary point p. In order to obtain the amount of offset correction by using the arbitrary point p or p' of the forward or backard path set on the non-linear portion of the hysteresis curve of the piezo actuator as a reference, the magnetic disk certifier obtains a drive voltage Vs (in the forward path) or Vs' (in the backward path) corresponding to the amount of offset correction obtained when the peak read voltage is detected and a determination of path, that is, the forward path or the backward path, and stores them in a memory together with the drive voltage at the arbitrary point p or p'. It may be possible to store the drive voltage together with a path flag indicative of the forward or backward path, in lieu of the determination of the path.

In correcting the offset, the magnetic disk certifier positions the write head on the hysteresis curve such that the position on the track in which the magnetic head is positioned and the test data is to be written becomes the position of the preliminarily and arbitrarily selected point p or p' by referring to the stored path flag and the drive voltage, write the test data therein and then the written test data is read by the MR head in the corrected position on the hysteresis curve.

The amount of offset in an outside region of the magnetic disk has a positive value and that in an inner region has a negative value. Further, as to the path on the major loop of the hysteresis curve of the usual piezo actuator on which the magnetic head is positioned, that is, the forward path or the backward path, an increasing range in the drive voltage from the original point (usually 0V) of the hysteresis curve to the maximum drive voltage Vm is the forward path and a decreasing range from the maximum drive voltage Vm is the backward path. Therefore, it is possible to distinguish the forward path from the backward path. Since the piezo actuator is extended in the forward path and shrunken in the backward path, the positive and negative offset correction is possible in each of the forward and backward paths.

On the other hand, when a peak of the read-out voltage from the MR head is detected in the forward path, the MR head is moving inwardly of the magnetic disk. Therefore, the MR head is offset with respect to the inductive head on the positive side. On the other hand, the read-out voltage peak is detected in the backward path, the MR head is offset with respect to the inductive head on the negative side.

Figure 3:
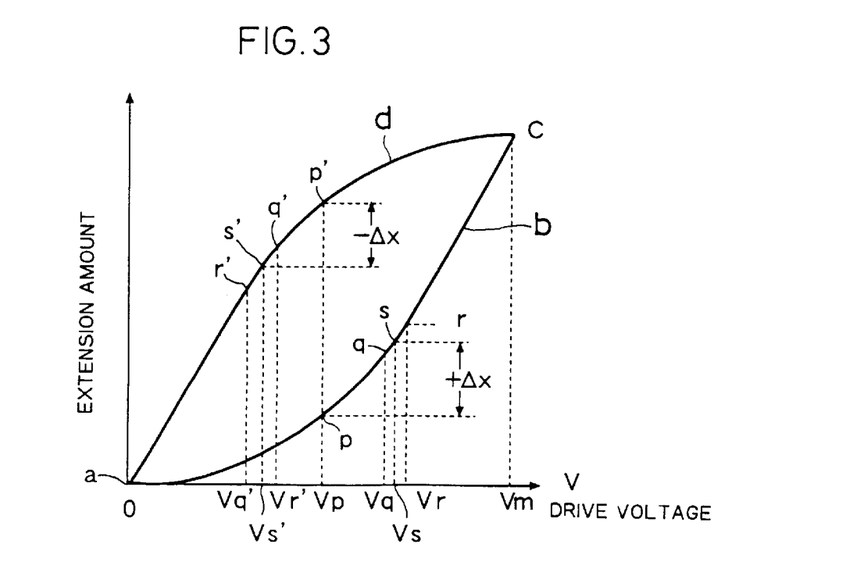
FIG. 3 is a graph showing a relation between a major loop of a characteristics of a piezo actuator of the magnetic disk certifier and a drive voltage V thereof.

Describing the major loop of the hysteresis curve in briefly, FIG. 3 shows the major loop which is within a voltage range between the drive voltage 0(V) of the piezo actuator and the maximum applicable voltage (maximum drive voltage) Vm(V) thereof. The voltage increasing side (a lower curve in FIG. 3) of the major loop is the forward path in which the drive voltage increases and the piezo actuator is extended and the voltage decreasing side (an upper curve in FIG. 3) is the backward path in which the drive voltage decreases and the piezo actuator is shrunken. The extension and shrinkage of the piezo actuator occur along the forward path and the backward path according to the drive voltage.

The shape of the major loop depends upon the piezo actuator and the drive voltage Vp for the write in the point p on the forward path or the point p' on the backward path can be preliminarily determined according to a specification of the piezo actuator. Thus, such drive voltage is preliminarily stored in a memory and, as mentioned previously, the amount of offset correction on either the forward path or the backward path is detected correspondingly to the direction of offset of the MR head.

Further, the magnetic disk certifier sequentially sets the magnetic head on the respective tracks of the magnetic disk to be tested, sets the drive voltage V of the piezo actuator at 0V (original point) every time when the magnetic head is set on the track, increases the drive voltage from 0V to the write drive voltage Vp when the offset is on the negative side and writes the test data in the track by positioning the inductive head. When the offset is on the positive side, the magnetic disk certifier sequentially sets the magnetic head on the respective tracks of the magnetic disk to be tested, sets the drive voltage V of the piezo actuator at 0(V) (original point) every time when the magnetic head is set on the track, increases the drive voltage from 0V through Vm(V) to the write drive voltage Vp' to set the inductive head at the write point p' on the backward path and writes the test data in the track.

As mentioned above, the drive voltage V is set to 0(V) (original point of the hysteresis curve) every time when the magnetic head is positioned in the track. This is because, if the drive voltage Vs is increased directly to the drive voltage Vp, the hysteresis curve enters into a minor loop which occurs on the major loop and the magnetic head can not be returned to the correct write point p or p' on the major loop. Further, after the write completes, the magnetic disk certifier increases the drive voltage Vp at the point p up to Vs in the forward path or decreases the drive voltage at the point p' to Vs' in the backward path, to position the magnetic head. Thus, the MR head can move finely on the specific hysteresis curve which is the same as that in the case where the amount of offset correction is set on the positive or negative side. Therefore, the offset is corrected such that it becomes substantially zero and the test data is correctly read out to appropriately certify the magnetic disk. In this case, the drive voltages Vp, Vp', Vs and Vs' which are employed for the offset correction are always effective in subsequent corrections so long as the execution of the disk certification is performed by using the same piezo actuator.

As a result, in the magnetic disk certifier, it is possible to precisely correct the offset of the MR head by a simple control for moving the MR head along a specific loop of the hysteresis curve, without necessity of the measurement of the offset amount $\Delta x$ of the MR head. Therefore, the reliability of certification of the magnetic disk is improved and so the yield of the magnetic disk is improved.

5. DETAILED DESCRIPTION OF THE PREFERRED EMBODIMENTS

Figure 1:
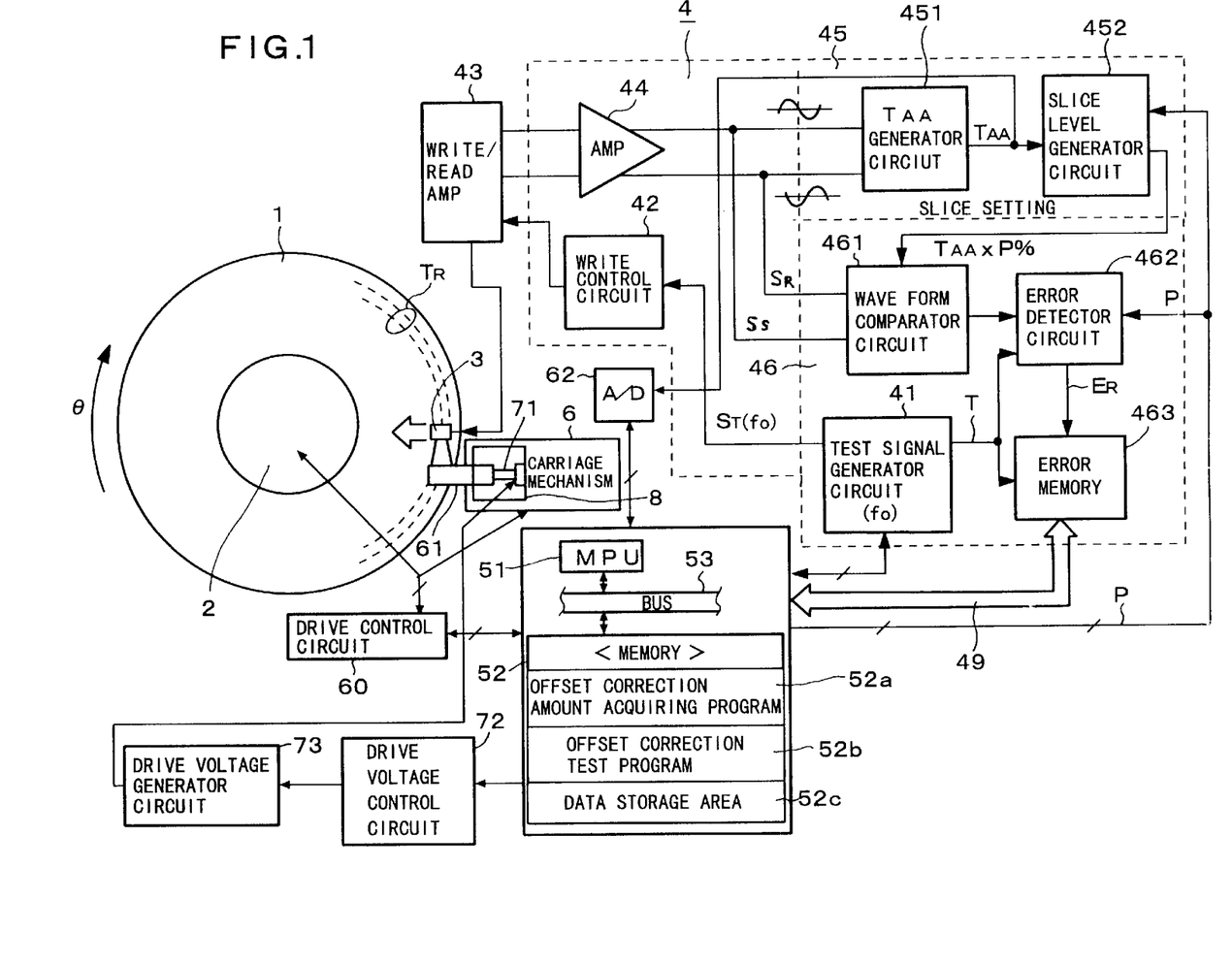
FIG. 1 is a block diagram of a magnetic disk certifier to which an offset correction method of the present invention is applied.

In FIG. 1 which is a block diagram of a magnetic disk certifier to which an offset correction method of the present invention is applied, a piezo actuator 71 is coupled to a support arm 61 which supports a magnetic head 3 to constitute a block 8 and the block 8 is fixed to a carriage mechanism 6. With this construction, the magnetic head 3 becomes possible to be moved finely orthogonally of tracks set on a magnetic disk 1 by applying a drive voltage to the piezo actuator 71. In this embodiment, the magnetic head 3 is mounted on the support arm 61 in a direction perpendicular to the moving direction of the piezo actuator 71.

Figure 2:
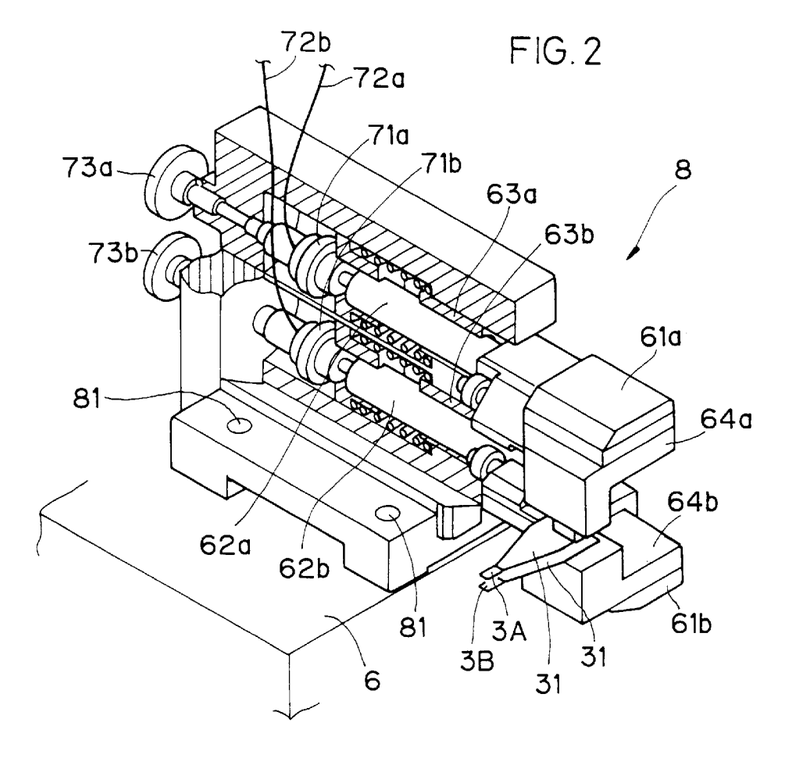
FIG. 2 is a partial cut away view of a carriage of the magnetic disk certifier shown in FIG. 1.

FIG. 2 shows the block 8 in more detail. In FIG. 2, the block 8 is fixed to a surface of the carriage 6 through screws screwed into a plurality of threaded holes 81. A magnetic head 3A positioned on the side of an upper surface of the magnetic disk 1 is mounted on a top end portion of a support arm 61a through a mounting block 64a and a magnetic head 3B positioned on the other surface of the magnetic disk 1 is mounted on a top end portion of a support arm 61b through a mounting block 64b.

The support arms 61a and 61b have slide shafts 62a and 62b connected to top end portions of the support arms, respectively. The slide shafts 62a and 62b are supported by slide bearings 63a and 63b, respectively. Therefore, the support arms 61a and 61b are slidably supported in the block 8. Further, rear end portions of the slide shafts 62a and 62b are integrally coupled with piezo actuators 71a and 71b, respectively, so that the support arms 61a and 61b move forward and backward correspondingly to extension and shrinkage of the piezo actuators 71a and 71b to thereby move the magnetic heads 3A and 3B radially of the magnetic disk 1. The rear end portions of the piezo actuators 71a and 71b are coupled to top end portions of regulation screws 73a and 73b, respectively, so that the positions of the support arms 61a and 61b can be regulated by the regulation screws 73a and 73b through the piezo actuators 71a and 71b, respectively. Reference numerals 72a and 72b depict lead wires for applying voltage signals to the piezo actuators 71a and 71b, respectively.

With this construction, it is possible to finely move the magnetic heads 3A and 3B radially of the magnetic disk 1 by applying drive voltages to the piezo actuators 71a and 71b, respectively. Each of the magnetic heads 3A and 3B includes an inductive head 3a and a MR head 3b and corresponds to the magnetic head 3 shown in FIG. 1 and will be referred to as the magnetic head 3, hereinafter.

Each of the support arms 61a and 61b shown in FIG. 2 corresponds to the support arm 61 shown in FIG. 1 and each of the piezo actuators 71a and 71b corresponds to the piezo actuator 71 shown in FIG. 1. Therefore, each of the support arms 61a and 61b and each of the piezo actuators 71a and 71b will be referred to as 61 and 71 hereinafter, respectively.

The magnetic head 3 including the inductive head 3a and the MR head 3b is moved finely radially of the magnetic disk correspondingly to the amount of extension or shrinkage of the piezo actuator 71. In order to realize this, the certifier shown in FIG. 1 includes a drive voltage control circuit 72 and a drive voltage generator circuit 73 as a control portion of the piezo actuator 71. The drive voltage control circuit 72 is connected through an interface (not shown) to the MPU 51 of the data processing portion 5. The MPU 51 controls the drive voltage control circuit 72 by using the program control and, in response to this control, the drive voltage generator circuit 73 generates a drive voltage and supplies it to the piezo actuator 71.

Further, in order to obtain a read voltage of the test data from the MR head 3b of the magnetic head 3, an average peak-to-peak read voltage value obtained from the $T_{AA}$ generator circuit 451 for 1 track is input through the A/D converter circuit (A/D) 62 to the data processor 5. The data processor 5 receives the read voltage value as a digital value. Thus, the MPU 51 obtains the average read voltage value for 1 track in which the magnetic head 3 is positioned.

A reference numeral 53 depicts a bus connecting the MPU 51 to the memory 52 and the memory 52 of the data processor 5 is provided with an area 52a for storing a program for acquiring the amount of offset correction, an area 52b for storing a testing and processing program for of the amount of offset correction and a data storage area 52c for storing the offset correcting drive voltage, etc.

Figure 4:
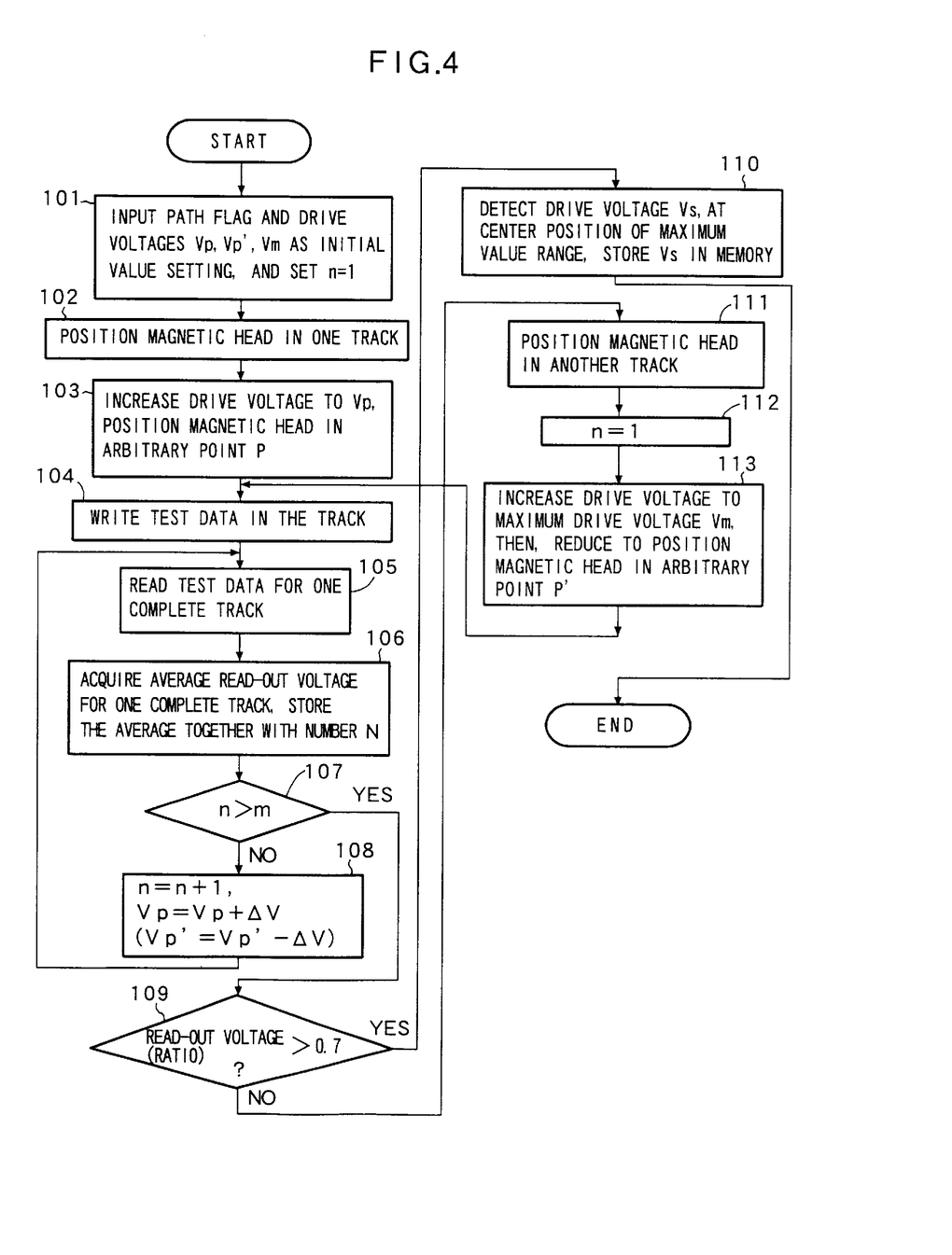
FIG. 4 is a flowchart showing a processing for obtaining the offset correction amount.

First, the acquirement of the data for offset correction will be described by referring to FIG. 4.

The MPU 51 executes the correction data acquiring program stored in the memory area 52a in response to a depression of a predetermined function key. In this case, as the initial value setting for correcting the offset of the MR head 3b with respect to the inductive head 3a, an operator preliminarily inputs the path flag "0" showing a forward path on the major loop of the hysteresis characteristics shown in FIG. 3, a drive voltage Vp at a point at which the test data of the forward path is written, a path flag "1" showing the backward path and the drive voltage Vp' at a point on the backward path of the major loop at which the test data is written. They are stored in the data storage area 52c of the memory 52. In the initial value setting, a variable n indicative of the number of fine movements of the MR head 3b is set to 1 (Step 101).

Since, in this invention, the offset amount Δx shown in FIG. 10 is unnecessary, it is not measured. Further, the drive voltage Vp (or Vp') is a voltage value corresponding to an arbitrary point on the forward path (or the backward path) of the hysteresis characteristics and Vp may be equal to Vp'. In the latter case, it is enough to store only Vp in the memory 52. Further, in lieu of the use of path flag, it may be possible to attach a positive sign and a negative to the forward drive voltage and the backward drive voltage, respectively, such that the path related to the drive voltage can be identified, that is, +Vp or −Vp.

The MPU 51 mounts the disk or the test disk 1 on the spindle 2, rotated the spindle 2 and positions the magnetic head 3 in a position of a suitable track TR (Step 102).

Then, the MPU 51 reads the drive voltage Vp of the forward path flag "0" from the memory 52, resets the drive voltage of the piezo actuator 71 to 0V (voltage at the original point) and then increases the drive voltage gradually up to the voltage Vp so that the inductive head 3a of the magnetic head 3 is positioned in an arbitrary point p (refer to FIG. 3) on the forward path determined by the amount of extension of the piezo actuator (Step 103).

The curve (a-b-c-d-a) shown in FIG. 3 corresponds to the major loop of the hysteresis characteristics of the piezo actuator 71. The lower end a of the loop corresponds to the drive voltage 0V and the upper end c thereof corresponds to the maximum drive voltage Vm. The lower curve (a-b-c) of the major loop is the forward path as mentioned previously and the upper curve (c-d-a) is the backward path.

The maximum drive voltage Vm and the shape of the major loop corresponding thereto depend upon the specification of the piezo actuator as mentioned previously. Thus, it is possible to position the inductive head 3a in the arbitrary point p on the forward path by increasing the drive voltage of the piezo actuator after the latter voltage is reset to 0V and to position the inductive head in the arbitrary point p' on the backward path by decreasing the drive voltage after it is increased to Vm. Therefore, the inductive head 3a is positioned in a position of the track on which the magnetic head 3 is positioned, which is determined by the amount of extension corresponding to the drive voltage Vp or Vp' with respect to the original point of the hysteresis characteristics.

Then, the MPU 51 writes the test data in the track TR by means of the inductive head 3a (Step 104). Then, the MPU 51 reads the test data corresponding to 1 full track and obtains the average peak-to-peak read voltage value of 1 track from the $T_{AA}$ generator circuit 451 (Step 105). The average peak-to-peak read voltage value is stored in the memory 52 together with the value of the variable n indicating the number of movements (initial value: n=1) and the current drive voltage V of the piezo actuator 71 (Step 106). Then, it is determined whether or not the magnetic head 3 is moved by a distance equal to or larger than 1 track width by n>m (Step 107), where m is the number of fine movements each equal to or larger than 1 track width.

If NO in the step 107, n is increased by 1, that is, n=n+1, and the drive voltage Vp is increased by a voltage $\Delta x$ corresponding to one fine movement, that is, Vp=Vp+$\Delta V$ (Step 108). In the case where the backward path point p' is set in the steps 111 to 113 to be described later, Vp'=Vp'−$\Delta V$.

Thus, the MR head 3b is finely moved along the forward path by a predetermined amount. In this case, the position of the MR head 3b is moved toward the center of the disk 1. In this case, since the piezo actuator 71 extends from the point in which the test data is written, the MR head 3b is moved radially inward to the center of the magnetic disk, that is, a minus direction, with respect to the center of the write track of the inductive head 3a.

Figure 5:
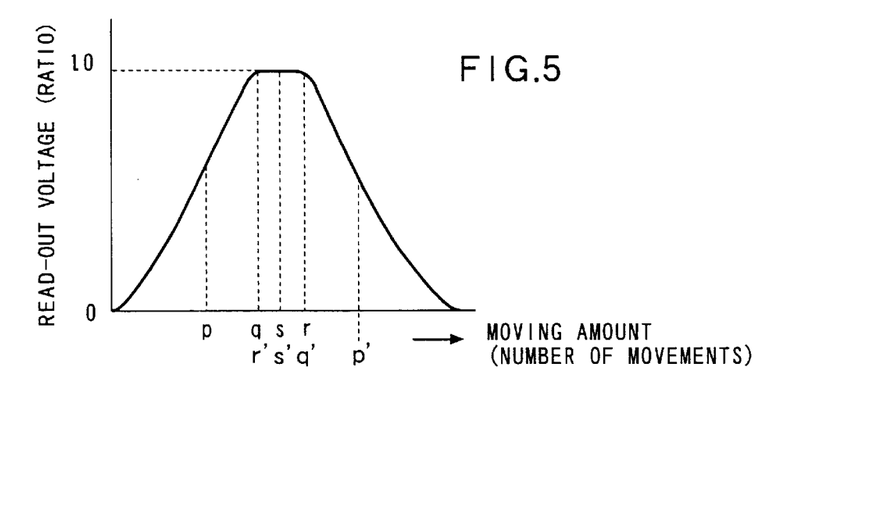
FIG. 5 is a graph showing a read-out voltage characteristics of the certifier when the MR head is moved finely.

Then, the operation is returned to the step 105 and the processing for obtaining the read-out voltage and storing it in the memory 2 together with the number of movements is repeated. When the answer in the step 106 becomes YES, the data such as shown in FIG. 5 is stored in the memory 52. In FIG. 5, the abscissa shows the number of movements or the moving distance calculated on the hysteresis characteristics according to the number of movements and the ordinate shows the read-out voltage ratio. The data of the read-out voltage are obtained at the point p through the point q to the point r, shown in FIG. 5, in the order by the repeated processing. It should be noted that the value of the initial read-out voltage is different according to the position of the arbitrary point p and the peak value appears in between the points q and r shown in FIG. 5. That is, the area in which the peak value appears is between the points q and r and, when the read-out voltage in this area is substantially uniform, this area becomes the area shown in FIG. 11 in which the read-out voltage is 1.0. In order to determine whether there is the area in which the read-out voltage value becomes maximum, it is determined whether or not there is a read-out voltage equal to or larger than a predetermined value (Step 109). In this embodiment, an existence of the peak is decided when there is a read-out voltage value (ratio) equal to or larger than the predetermined value (ratio) of 0.7. If YES in the step 109, the center position in the maximum value area is deemed as the peak point s and the drive voltage V corresponding to the point s is detected as the drive voltage Vs in the peak position. The voltage Vs is stored in the memory area 52c of the memory 52 together with the path flag "0" (Step 110). The drive voltage Vs becomes the drive voltage for correcting the offset.

A drive voltage at a peak point or a suitable point within the maximum value area between the points q and r may be employed as the drive voltage Vs.

Of course, the above case is where the MR head 3b has an offset on the plus side with respect to the inductive head 3a. When the offset is on the minus side, the characteristics shown in FIG. 5 can not be obtained as to be described later. In the latter case, there is no read-out voltage in the forward path of the hysteresis curve, which exceeds 0.7. Therefore, the answer in the step 109 is NO.

Since, in the case of the plus side offset, the MR head 3b moves from the point p at which the data is written toward the minus side, the amount of offset becomes a vertical difference +$\Delta x$ between the points p and s shown in FIG. 3.

The answer NO in the step 109 means that no peak is detected in the forward path. In such case, the drive voltage for the offset correction is obtained in the backward path. This will be described in detail.

When the answer in the step 109 becomes NO, the MPU 51 positions the magnetic head 3 in a track TS other than the track TR (Step 111). The variable n of the number of movements is set to 1 (Step 112), the drive voltage Vp' of the path flag "1" is read out from the memory 52 and after the drive voltage V is increased to the maximum drive voltage Vm, it is reduced to the drive voltage Vp' (Step 113). Thus, the position of the magnetic head (inductive head 3a) enters into the backward path and the piezo actuator 71 is driven in the shrinking direction. In this case, the inductive head 3a is set in an arbitrary point p' on the backward path (See FIG. 3). Then, the operation is returned to the step 104, wherein the test data is written in the track TS. In this embodiment, in order to simplify the control, the drive voltage value Vp is made equal to Vp'. The drive voltage Vp may be other than Vp', needless to say.

The processing in the steps 105, 106 and 107 is repeated. In the step 108, the variable n is updated by 1, that is, n=n+1, and the drive voltage Vp' is reduced by $\Delta V$ corresponding to one fine movement, that is, Vp'=Vp'−$\Delta V$, to move the MR head 3b along the backward path by a predetermined fine amount (Step 108). Then, the operation is returned to the step 105.

This processing is repeated until n>m is established and, in the step 106, the MPU 51 performs the read-out processing for reading test data on one full track of the magnetic disk to obtain the average peak-to-peak read-out voltage value from the $T_{AA}$ generator circuit 451 and stores the average peak-to-peak read-out voltage value in the memory together with the number n of the movements and the drive voltage V of the piezo actuator 71 (Step 116). Then, when the answer in the step 107 becomes YES, the data such as shown in FIG. 5 is stored in the memory 52.

Since the piezo actuator 71 shrunken from the point p' at which the test data is written by the piezo actuator 71 in this repeated processing, the MR head 3b is moved radially outward to the center of the magnetic disk, that is, in a plus direction, with respect to the center of the write track of the inductive head 3a and data of the read-out voltages are obtained at the point p' through the point q' to the point r' as shown in FIG. 5. When the maximum read-out voltage value in an area between the points q' and r' is substantially uniform, this area becomes the area shown in FIG. 11 in which the read-out voltage is 1.0. The center position in the maximum value area is deemed as the peak point s' and the drive voltage Vs' corresponding to the point s' is stored in the memory 52.

In this case, the MR head 3b is moved from the position p' at which the test data is written on the plus direction. Therefore, the offset is on the minus side. The offset in this case is a vertical distance $-\Delta x$ between the points p' and s' as shown in FIG. 3.

Then, it is determined whether or not there is a read-out voltage equal to or larger than a predetermined value (Step 109). If there is any, a center of it is deemed as the peak point s and the drive voltage V corresponding to the peak position is detected as the drive voltage Vs' and stored in the memory area 52c together with the path flag "1" (Step 110).

When the answer in the step 110 is NO, other arbitrary points p and p' are set and the same processing is performed therefor.

The data of the drive voltage Vs (or Vs') at the peak position is obtained as the amount of offset correction for the thus selected arbitrary point p or p'. In certifying magnetic disks to be tested by this magnetic head, it is possible to use this offset correction data so long as the same piezo actuator 71 is used. In such case, the path flags "0" and "1" stored in the memory becomes an information indicative of the direction of the offset of the MR head as the plus side offset and the minus side offset, respectively. That is, these flags represent a result of determination of the offset direction.

Although, in the above description, the magnetic head 3A and the magnetic head 3B are described without distinguishing them, the MR heads of these magnetic heads 3A and 3B may be moved simultaneously or independently. Further, the offset correction data of them may be employed respectively.

Figure 6:
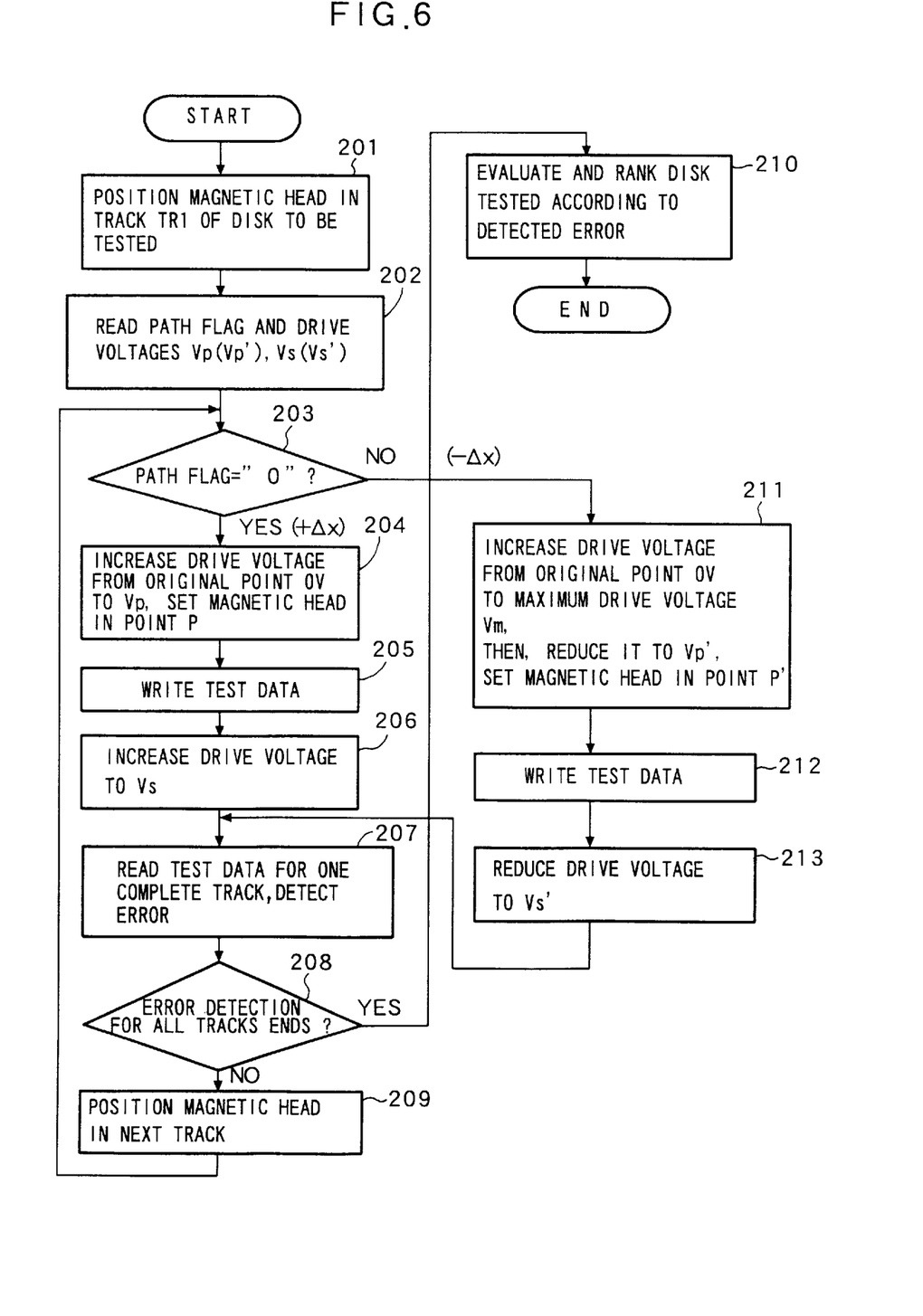
FIG. 6 is a flowchart showing a certifying processing by using the offset correction.

Procedures of the certifier test including the offset correction of the MR head 3b will be described with reference to a flowchart shown in FIG. 6. This processing is performed by an execution of the offset correction test processing program 52b stored in the memory 52 by the MPU 51.

In the magnetic disk test including offset correction, the MPU 51 positions the magnetic head 3 in positions of respective tracks of a certain magnetic disk sequentially and the drive voltage V is set again to a voltage Vp (or Vp') at the arbitrarily set point p read out from the memory by increasing the drive voltage V from the original point (0V) every time of the positioning. Thus, it is possible to reliably set the induction head 3a in the write point p in the forward path or the point p' in the backward path. The MPU 51 sets the magnetic head 3 in this write point p or p' and then writes the test data written in the positioned track, which may be the same as the test data used when the value of offset correction is obtained, therein. Then, the MPU 51 increases the drive voltage Vp from the write point p to Vs or reduces the drive voltage Vp' from the write point p' to Vs' and then sets the drive voltage preliminarily stored in the memory 52 to Vs or Vs'. With this procedure, the positional relation between the inductive head and the MR head becomes substantially the same as that when the amount of offset correction is obtained. As a result, the MR head is moved on the plus side or minus side to make the offset substantially zero, so that the test of magnetic disk becomes ready.

Processing for realizing this will be described with reference to FIG. 6 in which it is assumed that the test data 1 is mounted on the spindle 2 and rotated already.

First, the MPU 51 positions the magnetic head 3 in a first track TR1 of the test disk 1 (Step 201) and the MPU 51 reads the drive voltage Vp (or Vp'), the path flag "0" (or "1") and the drive voltage Vs (or Vs') for offset correction, which are stored in the memory 52 as the offset correction data (Step 202). Then, the MPU 51 determines whether or not the path flag is "0" (Step 203). If it is "0", that is, if the offset is $+\Delta x$, MPU 51 sets the drive voltage V to 0V corresponding to the original point of the major loop of the hysteresis characteristics of the piezo actuator 71, then increases the drive voltage from 0V to the write drive voltage Vp, sets the inductive head 3a in the point p on the forward path selected when the offset correction value is obtained (Step 204) and writes the test data in the point p (Step 205). Then, the MPU 51 moves the MR head 3b on the minus side by $\Delta x$ by increasing the drive voltage Vp up to the drive voltage Vs stored in the memory 52 (Step 206). Thus, the plus side offset of the MR head 3b is corrected such that it becomes substantially zero.

With the MR head 3b whose offset is corrected to substantially zero, the MPU 51 actuates the slice level setting circuit 45 and the defect detection circuit 46 to read the test data for one track and perform the error detection processing. In this case, the MPU 51 receives an error data for one track from the defect detection circuit 46 (Step 207). Then, the MPU 51 determines whether or not the error detection for all of the tracks is completed (Step 208) and, if NO, the MPU 51 positions the magnetic head 3 in the next track (Step 209) and the processing is returned to the step 203 to determine the path flag by using the already stored path flag and the MPU 51 repeats the steps 204 to 208.

If it is determined in the step 208 that the error detection processing for all of the tracks is completed, the evaluation and ranking processing of the test disk are performed in the step 210 according to the result of the detected error and the test disk detection processing is terminated. Then, the operation is shifted to the certification of the next magnetic disk.

On the other hand, if the path flag in the previous step 203 is "1", that is, when the offset is $-\Delta x$, the MPU 51 sets the drive voltage V to 0V corresponding to the original point of the major loop, increases it from 0V to the maximum drive voltage Vm and then reduces it from Vm to the drive voltage Vp' which may be equal to Vp. With these procedures, the inductive head 3a is set in an arbitrary point p' on the backward path (Step 211) and the test data is written therein (Step 212). Then, the MPU 51 reduces the drive voltage Vp' to the drive voltage Vs' read out from the memory 52 to move the MR head 3b by $\Delta x$ on the plus side (Step 213). As a result, the offset of the MR head 3b is corrected to zero.

Thereafter, the operation is shifted to the step 207, the determination as to whether or not the test of all of the tracks is completed is performed in the step 208 similarly and the operation is returned through the step 209 to the step 203. Then, the operation is performed again through the steps 211 to 213 to the steps 207 and 208 and thereafter it enters into the processing in the step 210.

In this embodiment, the forward path flag and the backward path flag are stored. Since the direction of offset on the forward path is opposite to that on the backward path, it may be possible to store the direction of offset or the direction of offset correction in the memory according to the plus side (forward path) or the minus side (backward path) of offset or the minus side (forward path) or the plus side (backward) of offset correction.

Further, the test data write point (arbitrary point p) on the forward path in this embodiment may be the original point of the hysteresis characteristics of the piezo actuator. The test data write point (arbitrary point p') on the backward path may be the maximum voltage point of the hysteresis characteristics of the piezo actuator.

In this embodiment, the major loop of the hysteresis characteristics has been described mainly. However, when a large minor loop is produced at a voltage value close to the maximum voltage, such minor loop may be employed.

The inductive head has been used currently as the write head mainly. However, the present invention is not limited to the inductive head and other type write head may be used in lieu of the inductive head.

What is claimed is:

1. An offset correction method for use in a magnetic disk certifier comprising a magnetic head including a write head for writing a test data and a read MR head for reading out the written test data, a magnetic head moving mechanism for moving said magnetic head to a predetermined track on said magnetic disk and a piezo actuator having a maximum drive voltage, for finely moving said magnetic head radially of said magnetic disk by extending or shrinking correspondingly to a drive voltage applied thereto, said method comprising the steps of:

obtaining the drive voltage corresponding to the maximum read-out voltage of the test data by the step of writing a test data in the predetermined track by said write head at an arbitrary point p on a specific hysteresis characteristics of said piezo actuator and the step of reading the written test data at a point by said MR head by finely moving said MR head by said piezo actuator to the point from the point p;

writing the test data or a certain test data in a track of a magnetic disk to be tested, by said write head set in the point p; and reading the written test data or the certain test data by said MR head by correcting the position of said MR head by applying the drive voltage corresponding to the maximum read voltage to said piezo actuator.

2. An offset correction method as claimed in claim 1, wherein the step of writing the test data in the predetermined track of the step of obtaining the drive voltage corresponding to the maximum read-out voltage comprises the steps of:

setting said magnetic head in the point p by increasing the drive voltage applied to said piezo actuator from the drive voltage corresponding to the original point of the specific hysteresis characteristics of said piezo actuator to a predetermined drive voltage and/or reducing the drive voltage to the predetermined drive voltage when the drive voltage passes through the maximum drive voltage; and writing the test data in said track by said write head, wherein the step of reading the written test data of the step of obtaining the drive voltage corresponding to the maximum read-out voltage comprises the step of:

reading out the written test data a plurality of times by repeating the fine movement of said MR head from the current position by increasing the drive voltage applied to said piezo actuator by a predetermined amount when the predetermined drive voltage does not pass through the maximum drive voltage or by reducing the drive voltage by a predetermined amount when the predetermined drive voltage passes through the maximum drive voltage, and wherein the step of reading the written test data by said MR head further comprises the steps of:

obtaining the read-out voltages corresponding to the respective drive voltages corresponding to the fine movements of said magnetic head; and detecting one of the drive voltages with which the read-out voltage of the test data becomes maximum.

3. An offset correction method as claimed in claim 2, wherein said specific hysteresis characteristics of said piezo actuator is a major loop, the drive voltage with which the read-out voltage becomes maximum is detected in a maximum value range, the detected drive voltage is selected from the maximum value range, the offset correction of said MR head of said certifier is performed through the steps of returning said magnetic head to the original point of the major loop every time said magnetic head is positioned on a track of said magnetic disk to be tested, moving said magnetic head from the original point and setting said magnetic head in the point p on the basis of the predetermined drive voltage, writing the test data or the certain test data therein and setting the drive voltage to the detected drive voltage when the written test data is read.

4. An offset correction method as claimed in claim 3, wherein said write head is an inductive head, the point p is a point on the major loop which is preliminarily selected, the read-out voltage is an average of read-out voltages obtained for a full track of said magnetic disk to be tested and the detected drive voltage is a center value of the maximum value range.

5. An offset correction method as claimed in claim 4, wherein each of the fine movements of said magnetic head is performed by increasing the drive voltage applied to said piezo actuator by a predetermined constant voltage to the drive voltage or reducing the drive voltage by the predetermined constant voltage or another constant voltage.

6. An offset correction method as claimed in claim 5, wherein the step of detecting the drive voltage comprises the step of determining an existence of a range of drive voltage when the obtained read-out voltage is equal to larger than a predetermined value; wherein the step of writing the test data comprises a first step of increasing the drive voltage from the drive voltage corresponding to the original point of the specific hysteresis characteristics of said piezo actuator to the predetermined drive voltage and a second step of reducing the drive voltage passing through the maximum drive voltage to the predetermined drive voltage; wherein the step of reading the test data comprises a first step of increasing the drive voltage by the predetermined constant value and a second step of reducing the drive voltage by the predetermined constant value or another constant value; and wherein the first steps of the step of writing the test data and the step of reading the test data are first selected and the second steps of the step of writing the test data and the step of reading the test data are selected when it is determined in the step of determining of the step of detecting the drive voltage that there is no maximum range.

7. An offset correction method as claimed in claim 3, wherein the predetermined drive voltage is the voltage corresponding to the original point of the hysteresis characteristics of said piezo actuator or the maximum drive voltage.

8. A magnetic disk certifier for certifying a magnetic disk by using a magnetic head including a write head for writing a test data and a read MR head for reading out the written test data, comprising:

a magnetic disk moving mechanism for moving said magnetic head to a predetermined track on said magnetic disk;

a piezo actuator having a maximum drive voltage, for finely moving said magnetic head radially of said magnetic disk by extending or shrinking correspondingly to a drive voltage applied thereto; and correction drive voltage detection means for obtaining the drive voltage corresponding to the maximum read-out voltage of the test data as a correction drive voltage by writing a test data in the predetermined track by said write head at an arbitrary point p on a specific hysteresis characteristics of said piezo actuator and reading the written test data at a point by said MR head by finely moving said MR head by said piezo actuator to the point from the point p, wherein the test data or a certain test data is written in a track of said magnetic disk to be tested, by said write MR head set in the point p and, the written test data or the certain test data is read out by said MR head, the position of said MR head is corrected by applying the drive voltage corresponding to the maximum read voltage to said piezo actuator.

9. A magnetic disk certifier as claimed in claim 8, wherein said correction drive voltage detection means comprises:

test data write means for setting said magnetic head in the point p by increasing the drive voltage from the voltage corresponding to the original point of the specific hysteresis characteristics of said piezo actuator to a predetermined drive voltage by increasing the drive voltage applied to said piezo actuator or reducing the drive voltage when the drive voltage passes through the maximum drive voltage and writing the test data in the predetermined track by said write head;

test data read means for reading out the written test data a plurality of times by repeating the fine movement of said MR head from the current position by increasing the drive voltage applied to said piezo actuator by a predetermined amount when the predetermined drive voltage does not pass through the maximum drive voltage or by reducing the drive voltage by a predetermined amount when the predetermined drive voltage passes through the maximum drive voltage; and drive voltage detection means for obtaining the read-out voltages corresponding to the respective drive voltages corresponding to the respective fine movements of said magnetic head and detecting one of the drive voltages with which the read-out voltage of the test data becomes maximum, wherein the position of said MR head is corrected by controlling said piezo actuator on the basis of the predetermined voltage when the test data is written and the detected drive voltage.

10. A magnetic disk certifier as claimed in claim 9, wherein said specific hysteresis characteristics of said piezo actuator is a major loop, the drive voltage with which the read-out voltage becomes maximum is detected in a maximum value range, the detected drive voltage is selected from the maximum value range, the offset correction of said returning said magnetic head to the original point of the major loop every time said magnetic head is positioned on a track of said magnetic disk to be tested, moving said magnetic head from the original point and setting said magnetic head in the point p on the basis of the predetermined drive voltage, writing the test data or the certain test data therein and setting the drive voltage to the detected drive voltage when the written test data is read.

11. A magnetic disk certifier as claimed in claim 10, wherein said write head is an inductive head and said test data write means, a portion or a whole portion of the operation of said test data read means and said drive voltage detection means is realized by a processor and a processing program stored in a memory and executed by said processor.

12. A magnetic disk certifier as claimed in claim 11, wherein the point p is a point on the major loop which is preliminarily selected, the read-out voltage is an average of read-out voltages obtained for a full track of said magnetic disk to be tested and the detected drive voltage is a center value of the maximum value range.

13. A magnetic disk certifier for certifying a magnetic disk by using a magnetic head including a write inductive head and a read MR head, comprising:

a magnetic head moving mechanism for moving said magnetic head to a predetermined track on said magnetic disk;

a piezo actuator having a maximum drive voltage, for finely moving said magnetic head radially of said magnetic disk by an extension or shrinkage of said piezo actuator corresponding to a drive voltage applied to said piezo actuator;

write means for setting said magnetic head in an arbitrary point p on a forward path or an arbitrary point p' on a backward path of a major loop of a hysteresis characteristics of said piezo actuator by preliminarily increasing the drive voltage from the voltage 0V corresponding to the original point of the specific hysteresis characteristics of said piezo actuator to a predetermined drive voltage $V_p$ by increasing the drive voltage applied to said piezo actuator or reducing the drive voltage to a predetermined drive voltage $V_p'$ through the maximum drive voltage of said piezo actuator and writing the test data in a suitable track of said magnetic disk;

drive voltage value detection means for finely moving said magnetic head along said forward path by gradually increasing the drive voltage $V_p$ or along the backward path by gradually reducing the drive voltage $V_p'$, detecting a range of maximum read-out voltage value of the test data in the forward path or the backward path by reading the written test data every time of the fine movement and detecting a drive voltage value in a center position of the maximum read-out voltage value range; and offset correction means for performing an offset correction of said MR head with respect to said inductive head by controlling said piezo actuator on the basis of an information of the forward path, the detected drive voltage and the drive voltage $V_p$ when the maximum value range is detected in the forward path or on the basis of an information of the backward path, the detected drive voltage and the drive voltage $V_p'$ when the maximum value range is detected in the backward path.

* * * * *